ись
United States Patent
Patange

(10) Patent No.: US 10,846,421 B2
(45) Date of Patent: Nov. 24, 2020

(54) METHOD FOR PROTECTING UNAUTHORIZED DATA ACCESS FROM A MEMORY

(71) Applicant: NXP B.V., Eindhoven (NL)

(72) Inventor: Sreedhar Patange, Bangalore (IN)

(73) Assignee: NXP B.V., Eindhoven (NL)

( * ) Notice: Subject to any disclaimer, the term of this patent is extended or adjusted under 35 U.S.C. 154(b) by 192 days.

(21) Appl. No.: 16/125,680

(22) Filed: Sep. 8, 2018

(65) Prior Publication Data

US 2019/0080111 A1     Mar. 14, 2019

(30) Foreign Application Priority Data

Sep. 8, 2017   (EP) ..................................... 17190154

(51) Int. Cl.
    *G06F 21/62*        (2013.01)
    *G06F 11/10*        (2006.01)
    *G06F 3/06*          (2006.01)
    *G06F 21/60*        (2013.01)

(52) U.S. Cl.
    CPC ........ *G06F 21/6218* (2013.01); *G06F 3/0604* (2013.01); *G06F 3/0622* (2013.01); *G06F 3/0634* (2013.01); *G06F 3/0659* (2013.01); *G06F 3/0673* (2013.01); *G06F 11/1012* (2013.01); *G06F 11/1044* (2013.01); *G06F 21/604* (2013.01)

(58) Field of Classification Search
    CPC ... G06F 21/316; G06F 21/45; H04L 63/0815; H04L 63/083; H04L 63/0876
    See application file for complete search history.

(56) References Cited

U.S. PATENT DOCUMENTS

| | | | |
|---|---|---|---|
| 6,938,193 B1* | 8/2005 | Honda | G06F 11/1008 714/720 |
| 2007/0061672 A1 | 3/2007 | Eggleston et al. | |
| 2007/0124557 A1 | 5/2007 | Kanai | |
| 2009/0216910 A1* | 8/2009 | Duchesneau | H04L 41/04 709/250 |
| 2012/0084552 A1* | 4/2012 | Sakthikumar | G06F 9/4812 713/100 |

(Continued)

FOREIGN PATENT DOCUMENTS

EP          2 645 249 A1      10/2013

OTHER PUBLICATIONS

Extended European Search Report for Patent Appln. No. 17190154.9 (dated Feb. 8, 2018).

*Primary Examiner* — Ali S Abyaneh
*Assistant Examiner* — Shu Chun Gao

(57) ABSTRACT

It is described a method for protecting unauthorized data access from a memory area of a computing system operable in a first operating mode and in at least one second operating mode, the method comprising: requesting, in the first operating mode, payload data stored in a memory area from a memory controller; retrieving, by the memory controller, the payload data from the memory area; retrieving, by the memory controller, second check data associated with the payload data from the memory area; failing by checking the payload data using the second check data according to a first check mechanism, while a check of the payload data using the second check data according to a second check mechanism passes.

15 Claims, 2 Drawing Sheets

(56) References Cited

U.S. PATENT DOCUMENTS

| | | | | |
|---|---|---|---|---|
| 2014/0201838 A1* | 7/2014 | Varsanyi | ............... | G06F 21/552 |
| | | | | 726/23 |
| 2016/0036463 A1* | 2/2016 | Heisswolf | ............. | H03M 13/09 |
| | | | | 714/764 |
| 2018/0323808 A1* | 11/2018 | David | ................. | G06F 11/1012 |
| 2018/0331692 A1* | 11/2018 | Gulati | ................. | G06F 11/2215 |

* cited by examiner

METHOD FOR PROTECTING UNAUTHORIZED DATA ACCESS FROM A MEMORY

CROSS-REFERENCE TO RELATED APPLICATIONS

This application claims the priority under 35 U.S.C. § 119 of European patent application no. 17190154.9, filed on Sep. 8, 2017, the contents of which are incorporated by reference herein.

FIELD OF THE INVENTION

The present invention relates to a method and a computing system for protecting unauthorized data access from a memory of the computing system, wherein the computing system may in particular be configured as a smartcard.

BACKGROUND OF THE INVENTION

Memory devices may be categorized into two broad categories as volatile and non-volatile. Volatile memory devices may require power to retain data, while non-volatile memories are capable of retaining data in the absence of a power supply.

Error code correction (ECC) engines are popular mechanisms in communication channels, memories and are well-known to those skilled in the art. An ECC engine is a device which performs a process of detecting bit faults/errors and correcting errors to ensure the integrity of data during transmission/repetition/retrieval.

In a memory-based integrated chip (IC), non-volatile (NV) memories may play an important role to store the manufacturer data for product configuration and to store user data which can be updated by the end customer.

In addition, redundant bits may be associated with the non-volatile stored data to ensure data integrity as a conventional mechanism. These redundant bits may be either odd/even parity bits or error code correction (ECC) bits (1-bit correction,2-bit detection, for example).

US 2007/0061672 A1 discloses a non-volatile memory with error detection, wherein an error detection circuitry in the memory device can be operated using parity data or ECC data stored in the memory and wherein results of the error detection are accepted by the memory controller for data repair operations by the controller.

Generally, all or most of such ICs may have different operating modes such as a user mode (having most restrictions and having limited access to a memory) and a test mode (having less restriction for debugging and having in particular full access to the memory). Thus, the test mode is more lucrative for a hacker intending to get access to data on the chip. Any critical configuration or data in the memories may be vulnerable for attacks if unintentional access to test mode is gained which may result in a business risk for IC manufacturer and risk for end customers personal data stored on the integrated circuit.

Thus, there may be a need for a method for protecting unauthorized data access from a memory of a computing system and there may be a need for a computing system being configured for protecting unauthorized data access from a memory of the computing system, wherein at least some of the above-mentioned problems may be reduced.

OBJECT AND SUMMARY OF THE INVENTION

According to an embodiment of the present invention it is provided a method for protecting unauthorized data access from a memory of a computing system operable in a first operating mode and in at least one second operating mode, the method comprising: requesting, in the first operating mode, payload data stored in a memory area from a memory controller; retrieving, by the memory controller, the payload data from the memory area; retrieving, by the memory controller, second check data associated with the payload data from the memory area; failing by checking the payload data using the second check data according to a first check mechanism, while a check of the payload data using the second check data according to a second check mechanism passes.

In particular, a protection mechanism for the data accessed from a memory is disclosed, where the system may switch to one of plural of pre-defined modes appropriately thereby securing the data/assets and may trigger resets once the data is tried to be accessed unintentionally after intrusion.

The method may for example be implemented in hardware and/or software and may in particular be executed on a chip. The computing system may comprise a desktop computer, a laptop computer, a cellular phone, a smartphone, a tablet computer, a smartcard or the like. The first operating mode and the second operating mode may be different modes of accessing or logging into the computing system. While in the first operating mode or in the second operating mode, different rights regarding reading/writing/executing (of particular files of different users or memory regions) may be imposed. The first operating mode may have considerable less restriction regarding accessing (such as reading and/or writing and/or executing) the memory of the computing system, such that the first operating mode is in particular suitable for testing the computing system.

After having tested the computing system and after delivering the computing system to an end user, the computing system may under normal conditions only run in the second operating mode, for example a user mode. In this second operating mode, the computing system may not be deteriorated in its essential functions or data, since in the second operating mode, only limited access to the memory may be enabled or allowed. However, a potential attacker may manage to log in into the computing system in the first operating mode which may allow access to essentially the full memory area. The attacker may be interested in accessing (in particular reading) data from the memory area, such as user data, configuration data and so forth.

In order to protect unauthorized data access, embodiments of the present invention may use parity/ECC bits (also referred to in general as check data) together with data to ensure the integrity of the memory contents, where in addition the parity/ECC bits may be inverted and stored along with data to increase the data robustness.

The payload data may for example comprise user data, system operation data, system configuration data, manufacturer data or the like. The payload data may be requested for example from an unauthorized attacker. The memory area may be controlled by the memory controller and all accesses to the memory area may be performed using or via the memory controller. The memory area may comprise several sections such as a section for payload data and at least one section for check data. The parity/ECC bits (in general any kind of check data) may be used together with data to ensure data integrity.

The check data may represent redundant data which may have been derived based on payload data being stored in the memory area and using for example a hash function or a checksum. The check data, in particular the second check data, may have been derived from the payload data when they were originally stored within the memory area. The second check data may have been derived using a second check mechanism which has been applied to the payload data. Thus, originally or previously, the payload data may have been stored in the memory area and additionally the second check data may have been stored in the memory area which have been derived from the payload data using the second check mechanism.

The second check mechanism may for example by default be associated with the second operating mode. However, when the attacker accesses the computing system or logs into the computing system in the first operating mode, by default, the first check mechanism may be applied whenever the memory area is accessed, for example when data from the memory area are read. The memory controller or in general the computing system as a whole may be configured to apply a particular check mechanism, i.e. the first check mechanism or the second check mechanism depending on whether in the first operating mode or in the second operating mode. This default setting or default association between particular operating mode and check mechanism may be provided by default, nevertheless not excluding that this default setting may be overwritten using particular software commands which may not be known to the attacker.

When the payload data is processed using the first check mechanism to generate corresponding check data, these check data do not match (in particular are not equal to) the second check data which may have been stored in the memory area during manufacturing or configuring the computing system in the factory or stored by an end user during normal use of the computing system. Thus, the checking the payload data using the second check data according to the first check mechanism fails. This failure is however not due to a deteriorated memory area but is due to not using the correct check mechanism. When however the second check mechanism is used on the payload data to derive check data, these correspond or are equal to the second check data. Since the potential attacker is not in knowledge of the second check mechanism and the attacker does not know that the second check mechanism was applied to derive the second check data, a read performed or triggered by the attacker of the payload data will fail, since the first check mechanism (instead of the second check mechanism) is applied on the payload data and the result is compared to the second check data which eventually fails.

The failure may be indicated to a user or may block particular (or all) functions of the computing system or may even reset the computing system. Thus, the attacker cannot access the memory of the computing system.

According to an embodiment of the present invention, the computing system, in particular the memory controller, is configured by default to check the payload data according to a first check mechanism, while in the first operation mode, wherein the computing system, in particular the memory controller, is configured by default to check the payload data according to a second check mechanism, while in the second operation mode.

The default may be changed using a particular command which may not be known to the attacker. More than two check mechanisms may be present and each of the check mechanisms may be associated with one or more operation modes. The particular check mechanism to be used may not only depend on the operational mode but may also depend on a specific calling command or may depend on which memory area is tried to be accessed and may depend on other criteria.

According to an embodiment of the present invention, the computing system comprises at least one register storing configuration for the memory controller that the first check mechanism is to be used when in the first operation mode, and that the second check mechanism is to be used when in the second operation mode.

The register may for example configure or comprise a peripheral bus between a memory controller and peripheral and/or a clock/reset mechanism. Any software trying to access the memory (under the control of the memory controller) may be required to pass through the peripheral bus which may also be considered as a border between software and hardware. When the first operation mode uses by default a first check mechanism and the second operation mode uses by default a second check mechanism, unauthorized access may advantageously be prohibited or at least reduced.

The at least one register provides a simple implementation to apply a first check mechanism when in the first operation mode and apply a second check mechanism when in the second operation mode. For example, the at least one register may comprise an association table associating the first operation mode with the first check mechanism and associating the second operation mode with the second check mechanism. In other embodiments, there is no association between the operational modes and the check modes.

According to an embodiment of the present invention, the first check mechanism is configured to derive first check data from the payload data, wherein the second check mechanism is configured to derive the second check data from the payload data, wherein the first check data differs from the second check data in at least one bit conversion or a number of bit conversions or all bit conversions or one of more logical operations, in particular comprising "AND" and/or "OR", and/or the like on bit pairs.

The first and also the second check mechanism may apply a deterministic calculation to derive the corresponding check data from the payload data. This may involve as applying a hash function or forming a checksum or the like. In particular, the second check data may be an inverted version of the first check data, i.e. in which all bits have been inverted, setting "0" to "1" and setting "1" to "0". Alternatively, only some of the bits may be inverted and others may be unchanged. Any objective function or mapping may be applied to derive the second check data from the first check data and vice versa. Thereby, a simple implementation of the method may be provided.

According to an embodiment of the present invention, the first check mechanism and the second check mechanism both comprise a same hash function and/or checksum algorithm, but store the result after applying a different conversion and/or modification. When both check mechanisms, i.e. the first and the second check mechanism, comprise a same hash function and/or checksum algorithm, the method may further be simplified. The conversion and/or modification may comprise a single bit inversion or a multiple bit inversion for example as has been explained above.

According to an embodiment of the present invention, the requesting the payload data is associated with a particular command specific for the first operating mode. The first operating mode may have available more commands than the second operating mode. The particular additional commands may be associated with a particular checking mode. Thus, whenever a particular command of the additional commands is called, which may involve accessing some payload data from the memory, an (command) associated check mechanism may be applied. Thereby, higher flexibility may be provided and the protection against an unauthorized attack may further be reduced. Using a command to request or access the payload data is just an example usage of the invention in the present smart-card IC, since the IC has to interact with Reader based on commands. However in general, the payload may be accessed with/without a command.

According to an embodiment of the present invention, the payload data comprise at least a portion of an operation system image for which the second check data have been determined and stored according to the second check mode. The operation system image may have been stored in the memory, in particular an EEPROM, using or applying for example the second check mechanism, thereby storing the second check data as redundant data in the memory. The payload data may comprise other data, such as configuration data, user data or default user data and so forth which may have been stored in the memory during manufacturing or before or after delivery to the end customer. While in the second operating mode a potential attacker may not have the right to access the full memory due to restrictions imposed by the operating system, because of which the attacker may try to invade the system in the first operating mode. However, reading any of the payload data may fail, since the payload data have originally been written using the second check mechanism.

According to an embodiment of the present invention, the check data comprises error correction and/or detection bits, in particular ECC bits and/or/parity bits. Error correction and/or detection bits may be useful for correcting an error or at least detecting an error. Error code correction (ECC) bits as well as parity bits are conventionally known and provide a reliable detection/correction capability.

According to an embodiment of the present invention, the first operating mode and the second operating mode have different restrictions regarding memory access, wherein the first operating mode is in particular a test mode having less restriction, in particular with full access to the memory area, wherein the second operating mode is in particular a user mode having restriction with limited access to the memory.

After the computing system has been delivered to the end customer, the computing system may under normal operation condition only operate in the second operating mode, such as a user mode. In the user mode, access to essential system data (such as operating or operation system data) may be prohibited. Thereby, the computing system may additionally be protected from deterioration.

According to an embodiment of the present invention, at least one (or even more than one, such as 2, 3, 4 or even more) third check mechanism is provided, which may be different from the first check mechanism and as well as from the second check mechanism. The different check mechanisms may have been applied during manufacturing or initial configuration of the computing system or during normal usage of the computing system by an end user and may for example be specific for different memory areas or specific to particular system commands. Thereby, further protection may be provided.

According to an embodiment of the present invention, the memory comprises a non-volatile memory, in particular an EEPROM. The memory may comprise other types of memory, such as ROM, RAM or the like.

According to an embodiment of the present invention, the computing system is configured to perform a reset after one or more failings, in particular one or more multi-bit faults.

Thereby, the potential attacker may effectively be prohibited from reading critical payload data, such as user data or system data.

It should be understood that features individually or in any combination disclosed, described or explained in the context of a method for protecting unauthorized data access from a memory of a computing system also apply, individually or in any combination, to a computing system according to embodiments of the present invention and vice versa.

According to an embodiment of the present invention it is provided a computing system operable in a first operating mode and in at least one second operating mode and configured for protecting unauthorized data access from a memory of the computing system, the computing system comprising: a memory area; a memory controller configured: to retrieve payload data requested while in the first operation mode from the memory area; to retrieve second check data associated with the payload data from the memory area; to check the payload data using the second check data according to a first check mechanism, to detect failing, while a check of the payload data using the second check data according to a second check mechanism passes.

According an embodiment of the present invention, the computing system is configured as a Smart-card.

Furthermore a program element (e.g. written in Java, C, C++, perl, phyton, etc.) is provided, which, when being executed by a processor, is adapted to control or carry out a method of one of the preceding embodiments.

Furthermore a computer-readable medium (e.g. CD, flash memory, embedded memory, etc.) is provided, in which a computer program is stored which, when being executed by a processor, is adapted to control or carry out a method of one of the preceding embodiments.

BRIEF DESCRIPTION OF THE DRAWINGS

The invention will be described in more detail hereinafter with reference to examples of embodiment to which the invention is not limited.

DESCRIPTION OF EMBODIMENTS

Figure 1:
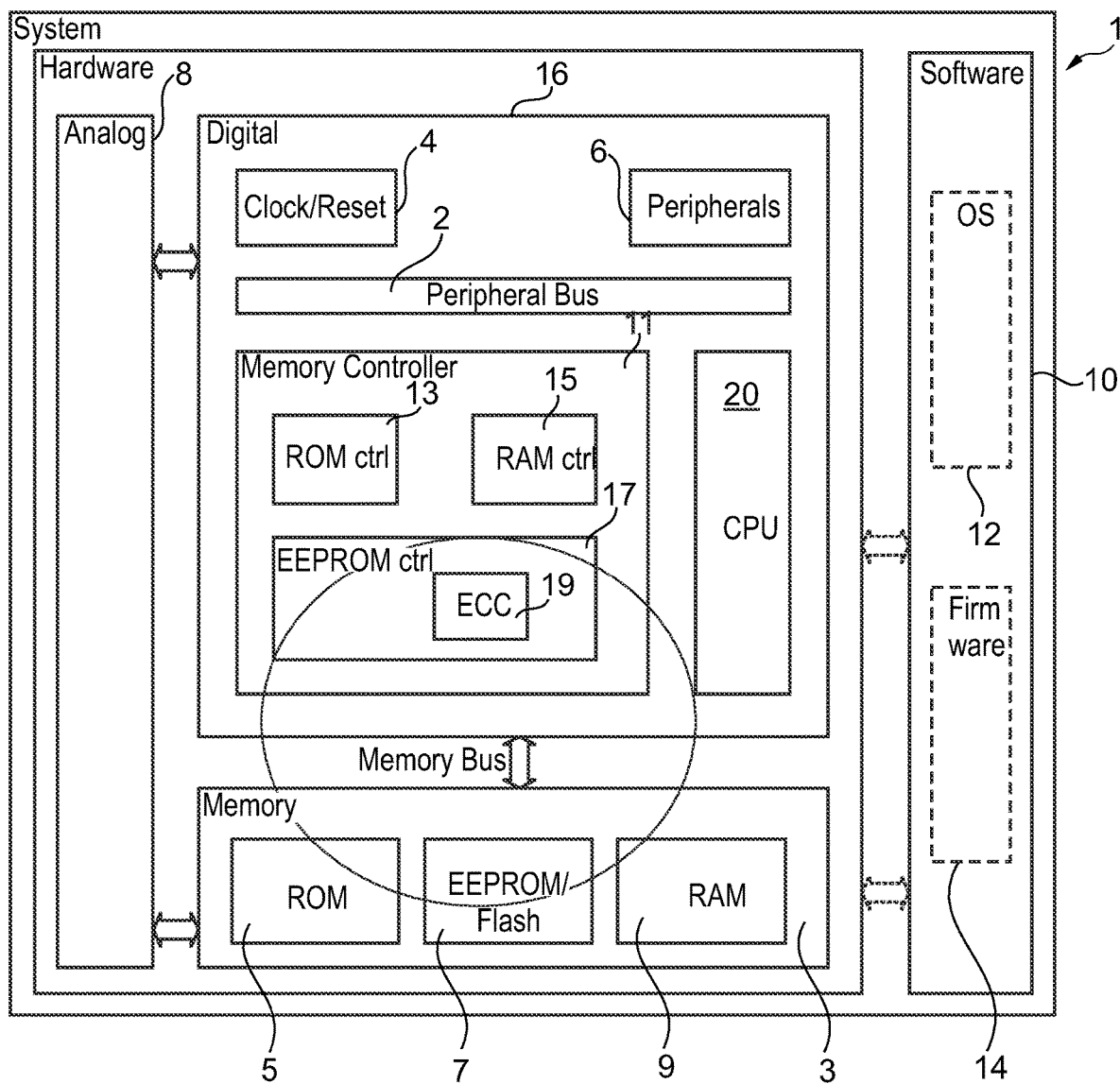
FIG. 1 schematically illustrates a computing system according to an embodiment of the present invention which is configured to carry out a method for protecting unauthorized data access from a memory according to an embodiment of the present invention.

The illustration in the drawing is schematically. In different drawings, similar or identical elements are provided with similar or identical reference signs.

The computing system 1 schematically illustrated in FIG. 1 according to an embodiment of the present invention is operable in a first operating mode and in at least one second operating mode and is configured for protecting unauthorized data accessed from a memory of the computing system. Thereby, the computing system comprises a memory area 3 where data, such as payload data and/or check data, may be stored. In the illustrated embodiment, the memory area comprises a ROM 5, an EEPROM/flash 7 and a RAM 9.

The computing system 1 further comprises a memory controller 11 which controls an access to the memory area 3.

In particular, the memory controller 11 comprises a ROM controller 13, controlling the ROM 5, a RAM controller 15 controlling the RAM 9 and an EEPROM controller 17 controlling the EEPROM/flash 7. In particular, the EEPROM controller 17 comprises a data check module 19 implementing a first check mechanism and a second check mechanism as will be explained in more detail below.

The memory controller 11 is configured to retrieve payload data requested while in the first operation mode from the memory area 3, to retrieve second check data associated with the payload data from the memory area 3 and to check the payload data using the second check data according to a first check mechanism (comprised in the data check module 19), to detect failing, while a check of the payload data using the second check data according to a second check mechanism (comprised in the data check module 19) passes.

The data check module 19 can also be referred to as an ECC block which indicates the ECC engine. The EEPROM controller 17 sets the ECC mode appropriately once the software configures the corresponding SFR, wherein SFR refers to a Special Function Register mainly for handshake between Software & Hardware.

The EEPROM controller 17 takes care of appropriate ECC mode while reading/writing the data from/to EEPROM 7. According to an embodiment of the present invention it is assumed that ECC bits (e.g. as check data) are associated with data in the memory area 3, in particular non-volatile memory area 3. Embodiments of the present invention provide a simple and effective mechanism with very minimal impact on the software code size and system performance but a huge improvement in protecting the data/assets in the non-volatile memory, such as memory area 3. Embodiments of the present invention may protect the memory contents by maintaining at least two modes for the ECC bits handling (i.e. a first check mechanism and at least one second check mechanism) such as a normal-ECC mode (e.g. a first check mechanism) and an inverted ECC mode (e.g. a second check mechanism).

The computing system further comprises a CPU 20, a peripheral bus 2, a clock/reset module 4, peripherals 6, which are all within the digital block 16. The digital block communicates with an analog block 8. Software 8 comprising operating system 12 and firmware 14 also communicates with the digital block 16.

Figure 2:
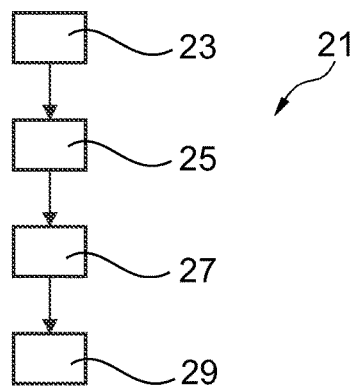
FIG. 2 schematically illustrates a flow-chart of a method for protecting unauthorized data access from a memory according to an embodiment of the present invention.

FIG. 2 schematically illustrates a flow-chart of a method 21 for protecting unauthorized data access from a memory according to an embodiment of the present invention. The method 21 starts by requesting 23, in the first operating mode, payload data stored in a memory area 3 from the memory controller 11. The method proceeds with retrieving 25 by the memory controller 11, the payload data from the memory area 3. In the next step 27, second check data associated with the payload data are retrieved from the memory area 3. In the last method step 29, the payload data using the second check data are checked according to a first check mechanism, thereby failing, while a check of the payload data using the second check data according to a second check mechanism passes.

Figure 3:
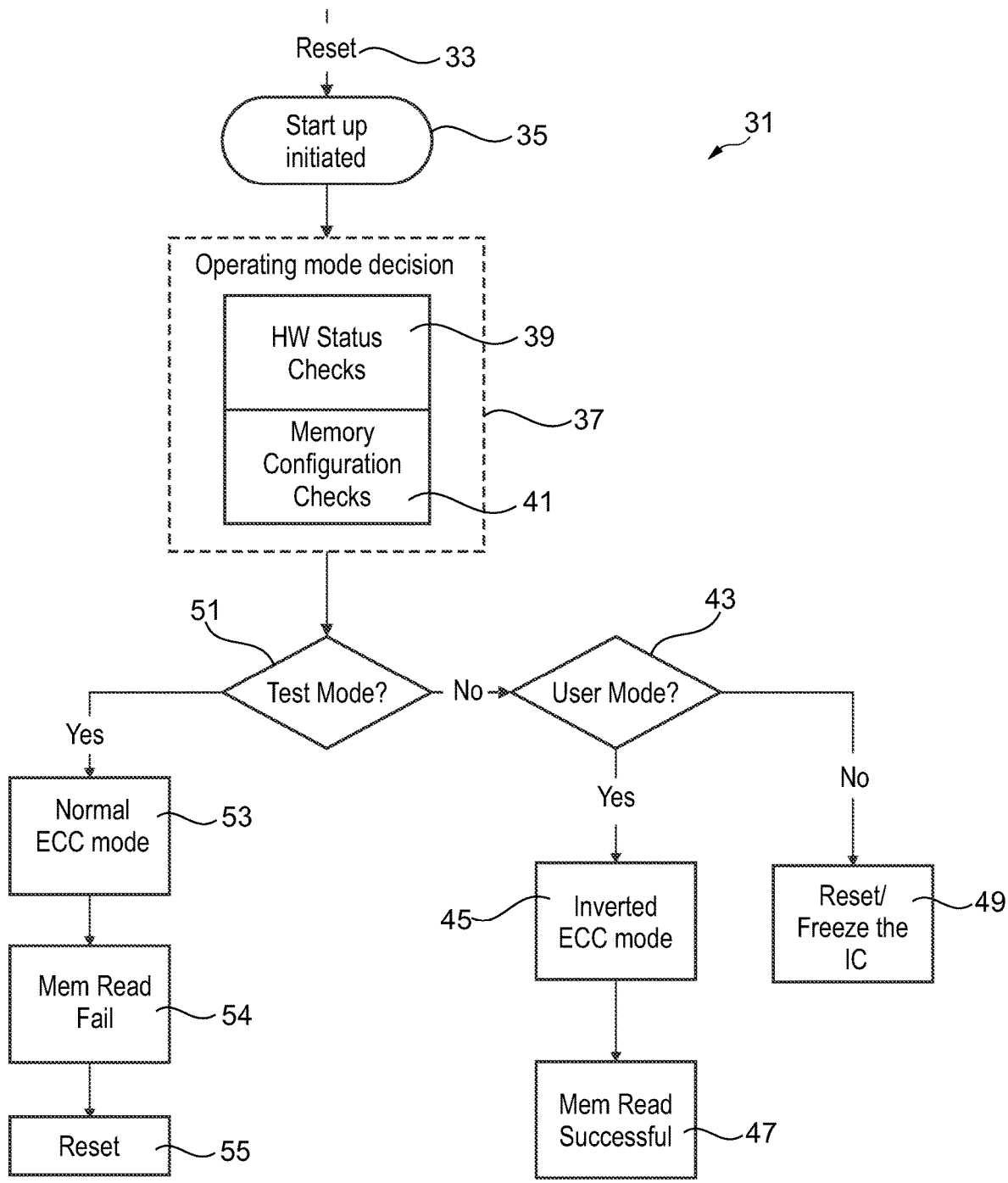
FIG. 3 schematically illustrates a flow-chart of a method for protecting unauthorized data access from a memory according to another embodiment of the present invention.

FIG. 3 illustrates a flow-chart of a method for protecting unauthorized data access from a memory according to another embodiment of the present invention. The method scheme 31 starts with a reset 33, where the computing system, such as computing system 1 illustrated in FIG. 1, is reset. The reset is performed after the EEPROM image is prepared with the inverted ECC mode. Thus, the operation system image is stored on the EEPROM 7 and second check data are derived using or applying a second check mechanism and are written also to the memory 3. Furthermore, the hardware is configured in order to trigger a reset, if multi-bit faults are detected in the memory read. Thus, the hardware is designed in such a way that if multi-bit faults are detected on the data read from the non-volatile memory, it shall result in system reset.

The method continues with a start-up initiated 35 followed by an operating mode decision 37 in which the hardware status is checked in box 39 and in which a memory configuration check is performed in the box 41. When a potential hacker accesses the system, it may also run through steps 33 to 41 of the method scheme 31 illustrated in FIG. 3.

During the system start-up/boot sequence, if the program flow enters the user mode (e.g. first operation mode) (decision block 43), then the software shall configure the hardware such that the memory is accessed with the inverted-ECC mode (e.g. a first check mechanism) as indicated in block 45. This may match the non-volatile image stored in a previous step and result in a successful memory read 47.

If the user mode is not entered, then it is branched to block 49, wherein a reset is performed or a freeze of the integrated circuit is performed.

However, if the program flow enters the test mode (e.g. a first operation mode) in decision block 51, then the software shall configure the hardware such that memory is accessed with the normal-ECC mode (e.g. a first check mechanism), as is indicated in the block 53, which normal-ECC mode may correspond to the first check mechanism. Without switching to the inverted-ECC mode (i.e. the second check mechanism), a system reset 55 will result, since the memory read fails in block 54.

If an attacker manages to enter the test mode by some fault injection mechanisms, all the steps 33 to 55 will result in a "Booby trap", since the attacker is unaware of the two modes of the ECC bit handling. Thereby, the attacker cannot read the non-volatile memory data and the security assets are not exposed easily.

In a conventional system, when in the user mode or in the test mode, the same check mechanism would be used such that the attacker would not encounter a memory read fail in block 54, since block 53 would perform for example also an inverted-ECC mode as the block 45 when in the user mode. In FIG. 3, the memory read fail 54 provides a block for or prohibits the attacker to protect further data access, to form a kind of a simple firewall.

Embodiments of the present invention may provide a simple mechanism with a very minimal impact on the software code size and system performance but a huge improvement and protecting the data/assets in the non-volatile memory. Embodiments of the present invention provide a huge market potential, since embodiments of the present invention may be used in all non-volatile memory-based products. Embodiments of the present invention may be easily extended to different types of non-volatile memories, such as ROM, EEPROM, flash.

Embodiments may be extended to volatile memories as well but need to be careful assessment, since volatile data may act as address pointers or global/local variables. Embodiments of the present invention may, with careful assessment, extended to specific peripherals/co-processors.

Embodiments of the present invention protect data access from the specific memory/peripheral (by triggering system resets). The embodiments do not block access to other peripherals/co-processors and thus such an access may be used for detecting the infringements via some pre-defined test commands.

Inverting the ECC is just an example of providing different check mechanisms. The inversion may be replaced with any other combination of logical operation(s).

Even though embodiments have been explained with two modes of ECC as an example, it can be easily extended to any number of modes supported for a given IC.

Even though embodiments were explained with ECC as an example feature, it can be easily extended to any product features that are a must for the end-product but can be disabled during the debug/lab validation.

Embodiments of the present invention may be associated with any test mode (e.g. first operation mode) specific commands which are not accessible for the end user. Corresponding features mentioned in the previous advantages may be switched appropriately before using these test commands.

Even though embodiments were explained with non-volatile memory as an example, embodiments of the present invention may easily be applied or extended to different kinds of memory, such as RAM, ROM, flash, . . . , etc.

Embodiments of the present invention address the problem of unauthorized data access (for example by a hacker) in the higher privileged mode (test mode) from the system perspective.

The invention claimed is:

1. A method for protecting unauthorized data access from a memory area of a computing system operable in a test operating mode and a user operating mode having more restrictive access requirements than the test operating mode, the method comprising:
   initializing, by a memory controller, the memory area with first check data using an inverted ECC (error code correction) mode;
   configuring the memory controller to apply the inverted ECC mode when access to the memory area is requested while in the user operating mode;
   configuring the memory controller to apply a non-inverted ECC mode when access to the memory area is requested while in the test operating mode; and
   during an access to the memory area while operating in the test operating mode, changing the non-inverted ECC mode to the inverted ECC mode in response to receiving a particular command.

2. The Method according to claim 1,
   wherein the memory controller is configured by default to check payload data stored in the memory area according to the non-inverted ECC mode while in the test operating mode, and
   wherein the memory controller is configured by default to check the payload data stored in the memory area according to the inverted ECC mode while in the user operating mode.

3. The Method according to claim 1,
   wherein the computing system comprises at least one register storing configuration for the memory controller that the non-inverted ECC mode is to be used when in the test operating mode, and that the inverted ECC mode is to be used when in the user operating mode.

4. The Method according to claim 1,
   wherein the inverted ECC mode is configured to derive the first check data from payload data,
   wherein the non-inverted ECC mode is configured to derive second check data from the payload data, and
   wherein the first check data differs from the second check data in at least one bit inversion or a number of bit inversions or all bit inversions.

5. The Method according to claim 1,
   wherein the inverted ECC mode and the non-inverted ECC mode both comprise a same hash function and/or checksum algorithm, but store a result after applying a different conversion and/or modification.

6. The Method according to claim 1,
   wherein the particular command is specific for changing the non-inverted ECC mode to the inverted ECC mode.

7. The Method according to claim 1,
   wherein the payload data comprises at least a portion of an operation system image.

8. The Method according to claim 1, further comprising resetting the computing system in response to detecting multi-bit faults during an access to the memory area.

9. The Method according to claim 1, wherein initializing the memory area with the first check data occurs during a startup boot sequence of the computing system.

10. The Method according to claim 1,
    wherein the memory area comprises a non-volatile memory.

11. The Method according to claim 1, further comprising initializing the memory area to be accessed using the inverted ECC mode during the user operating mode.

12. The method of claim 1, further comprising implementing the method on a smartcard.

13. A The method of claim 1, wherein the method is implemented as a computer program and stored in a non-transitory computer-readable medium adapted to be executed by a processor.

14. A computing system comprising:
    a memory, the memory including a memory area;
    a memory controller configured:
    to initialize the memory area with first check data using an inverted ECC (error code correction) mode;
    to configure the memory controller to apply the inverted ECC mode when access to the memory area is requested while in a user operating mode;
    to configure the memory controller to apply a non-inverted ECC mode when access to the memory area is requested while in a test operating mode; and
    during an access to the memory area while operating in the test operating mode, to change the non-inverted ECC mode to the inverted ECC mode in response to a particular command.

15. The computing system according to claim 14, configured as a Smart-card.

\* \* \* \* \*